United States Patent [19]

Staub, Jr.

[11] Patent Number: 4,779,515
[45] Date of Patent: Oct. 25, 1988

[54] VACUUM BRAKE BOOSTER WITH BAYONET MOUNT HAVING SNAP-RETAINED MOUNTING ARM

[75] Inventor: Vincent M. Staub, Jr., Dayton, Ohio

[73] Assignee: General Motors Corporation, Detroit, Mich.

[21] Appl. No.: 49,788

[22] Filed: May 15, 1987

[51] Int. Cl.⁴ ............... F01B 11/02; F01B 29/00; B25G 3/16
[52] U.S. Cl. ............................ 92/128; 92/161; 92/169; 403/315; 403/349; 248/222.1; 24/590
[58] Field of Search ............ 22/98 D, 128, 146, 161, 22/169.2, 169.1; 24/590–593, 671–674, 371; 403/194, 199, 201, 314, 315, 326, 348, 349; 248/222.1, 222.3

[56] References Cited

U.S. PATENT DOCUMENTS

| 757,712 | 4/1904 | Arnold | 403/348 X |
| 2,977,935 | 4/1961 | Randol | 91/369 B |
| 3,291,194 | 12/1966 | Kirtley et al. | 248/222.1 X |
| 3,478,992 | 11/1969 | Raschke | 248/222.3 X |
| 3,480,903 | 11/1969 | Filson | 403/348 X |
| 3,900,931 | 8/1975 | Lavoillotte | 24/590 |
| 3,999,873 | 12/1976 | Green et al. | 403/315 X |
| 4,455,829 | 6/1984 | Seip | 92/128 X |
| 4,538,967 | 9/1985 | Furukawa | 403/349 X |

Primary Examiner—Robert E. Garrett
Assistant Examiner—George Kapsalas
Attorney, Agent, or Firm—D. D. McGraw

[57] ABSTRACT

A bayonet mounted brake booster assembly has a separate mounting arm which is snapped and retained in position shortly before installation of the booster assembly in the vehicle.

2 Claims, 1 Drawing Sheet

VACUUM BRAKE BOOSTER WITH BAYONET MOUNT HAVING SNAP-RETAINED MOUNTING ARM

BACKGROUND OF THE INVENTION

The invention relates to a mounting arrangement for mounting a power head such as that of a brake booster to a fixed panel, the mounting being arranged on one side of the panel for simplified assembly. It more particularly relates to a securing arrangement for rotated mounting of a brake booster to the dash of a vehicle. It is an improvement over portions of the booster mount disclosed and claimed in co-pending U.S. application Ser. No. 776,698, entitled "Booster Mount", filed Sept. 16, 1985 and assigned to the common assignee. It is also related to the booster mount disclosed and claimed in co-pending U.S. application Ser. No. 001,697, entitled "Booster Mount", filed Jan. 9, 1987 and assigned to the common assignee. The booster may be of a conventional type, which is normally mounted to the vehicle dash panel with the booster in the engine compartment of the vehicle and the booster push rod extending rearwardly into the passenger compartment and attached to a brake pedal arm for actuation by the vehicle operator. It has been common practice for many years to secure a brake booster housing to the firewall of a vehicle by means of studs extending through holes in the firewall. In some instances a mounting bracket may be secured to the firewall and the booster is in turn secured to the mounting bracket.

The booster mount of the co-pending application Ser. No. 776,698 noted above includes a housing plate on the power head which is meshed with and turned to cam lock into another plate which is secured to the vehicle dash. Once the booster power head has been interlocked in spring-loaded camming relation, a fastener or fasteners may be secured to an arm formed as a part of the housing plate to keep the booster power head from rotating in the reverse direction to become unlocked. All of the motions of installing the power head are circular about the axis of the power head and push rod, the camming action producing a slight axial movement as the power head is cam locked in place. The arm of that application extends well beyond the housing plate and the power head and is readily subject to being damaged during handling before it is secured in place.

The booster mount of the co-pending application Ser. No. 001,697 noted above permits a shorter arm to be provided as a part of the housing plate or cam bracket so that it terminates near the power head housing and radially inwardly of that housing's maximum radius while permitting easy access for securing the arm in a desired arcuate position. It employs an intersection of arcs arrangement using two arm sections with one arm section being locked in place by the other arm section after booster installation to secure the booster, arcuately.

SUMMARY OF THE INVENTION

The invention herein disclosed and claimed includes a separately provided arm for the booster assembly which is designed to be attached to the assembly immediately before the assembly is being installed in the vehicle. This fully protects the arm from damage during handling operations involving the booster assembly itself. It also simplifies the installation, and particularly the time required for such installation of the arm. The arm has an inner end engaging the bracket and the booster housing in spring loaded relation. The main body or central portion of the arm has a pivot extending laterally therefrom and also has detent tabs formed on either side of the pivot but spaced therefrom. The cam bracket has a slot which receives the arm pivot and another slot defined in part by a tab which receives one of the detent tabs of the arm as the arm is positioned with the pivot in the slot and is moved rotatably and translatably to engage the bracket and housing in spring loaded relation while one of the arm detent tabs engages the bracket slot and detent tab defining a portion of the slot. As the arm is pivoted and moved, the arm detent tab passes over and engages the end of the bracket slot defining detent tab, while the other arm detent tab is engaged with an outer edge surface of the cam bracket, so that the arm is removably but lockingly secured to the bracket by the detent tabs of the bracket and arm, the arm pivot, and the spring loaded engagement of the inner end of the arm with the bracket and the booster housing. The outer end of the arm is provided with an arrangement by which the arm may be secured to the wall on which the booster is being mounted. By way of example, this may be a hook-shaped end having an opening which readily mates with appropriate fastening means already provided.

DETAILED DESCRIPTION OF THE PREFERRED EMBODIMENT

Figure 1:
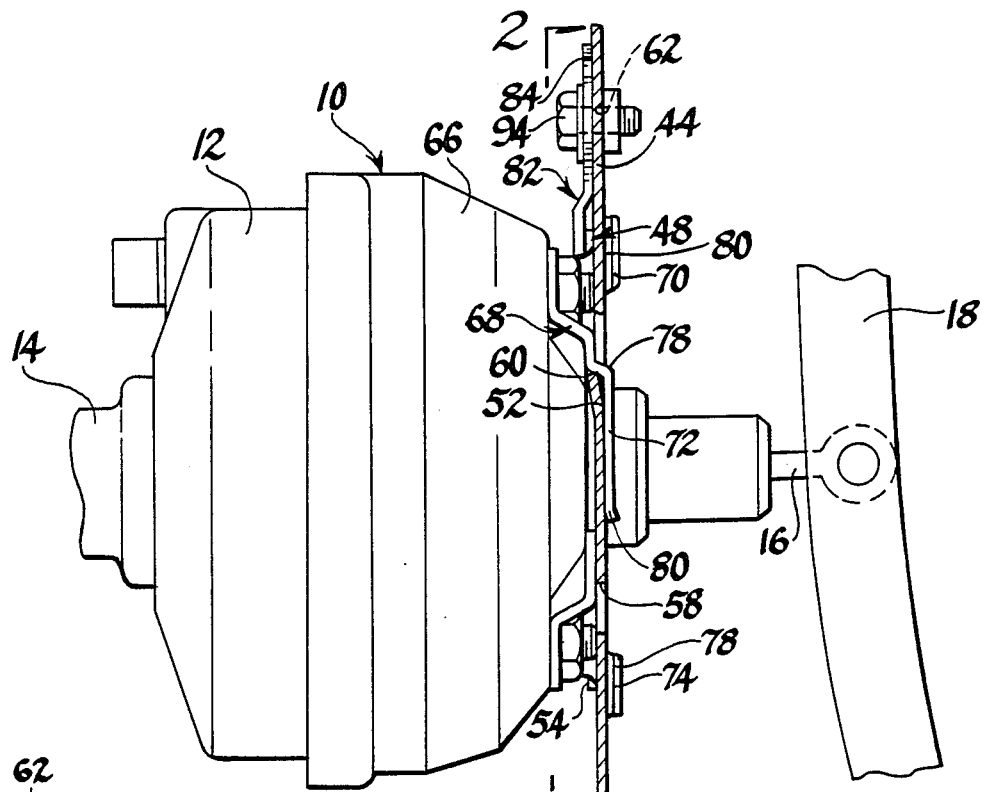
FIG. 1 is an elevation view with parts broken away and in section and illustrating a brake booster power head secured to a vehicle dash or firewall panel by an arrangement embodying the invention.

The power head 10 shown in the drawing is illustrated as being a brake booster assembly including a booster housing 12 and a master cylinder assembly 14 actuated by the booster, as is well known in the art. The booster assembly 10 includes a push rod 16 extending rearwardly and connected to the brake pedal arm 18 of the vehicle for actuation.

The vehicle in which the assembly 10 is installed has a fixed panel 44 which is sometimes identified as a firewall or dash. The portion of the panel which is directly related to the mounting arrangement for the booster is preferably a planar panel section as illustrated in FIG. 1. It has an opening 46 formed therein through which the rearward portion of the booster assembly 10, particularly including push rod 16, axially extends. An annular cam plate section 48, either formed as an integral part of panel 44 or secured to the side of the panel 44 faces the engine compartment of the vehicle. It is secured about or defines the panel opening 46. The cam plate 48 has a series of circumferentially spaced cam plate tabs 50, 52, 54 and 56 extending radially inwardly therefrom and at least partially in axially spaced relation to the planar panel section of fixed panel 44. While four such cam plate tabs are shown, it is recognized that three or more cam plate tabs will function quite well. Each of the cam plate tabs has an arcuately oriented trailing edge 58 and an arcuately oriented leading edge 60. A leading edge is the first of the two tab edges of one tab which by relative movement arcuately approaches or is arcuately approached by another tab during relative movements between the two tabs which secure the booster assembly 10 to panel 44. The leading edge 60 of each cam plate tab is spaced axially further away from the planar panel section of panel 44 than is the trailing edge 58 of each of the cam plate tabs. If the cam plate is an integral part of panel 44, the trailing edges may be within the planar panel section of panel 44. In either case, each of the cam plate tabs is positioned in a plane which is at an angle to the plane of the planar panel section of panel 44. Panel 44 is also provided with another opening 62 which is spaced radially outwardly of the annular cam plate 48. This opening provides a securing and locating mount opening as will be further described.

Figure 3:
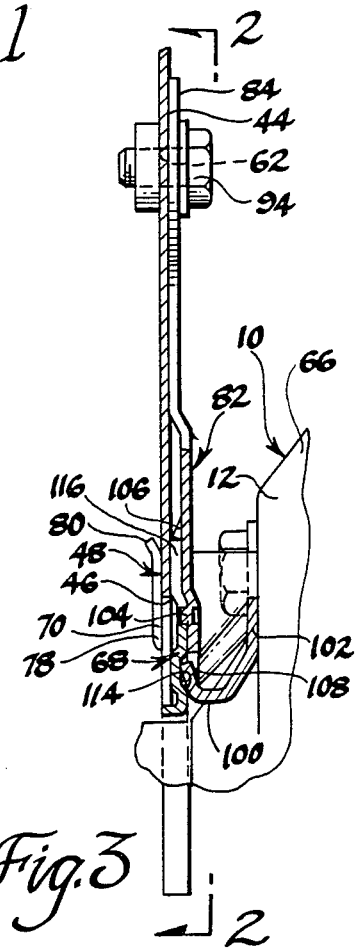
FIG. 3 is a fragmentary cross-section view taken in the direction of arrows 3—3 of FIG. 2.
Figure 4:
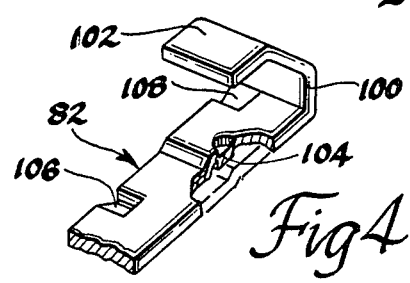
FIG. 4 is a perspective view of the mounting arm of the booster mount embodying the invention, with parts broken away and in section.

The power head housing 12 includes a housing section 66 which extends axially and radially, with the push rod 16 extending outwardly therefrom. An annular cam bracket 68 is to the power head housing section 66 about the push rod 16. Cam bracket 68 has circumferentially bracket tabs 70, 72, 74 and 76 which extend radially and are in axially spaced relation to the head housing section 66. Each of the bracket tabs has an arcuately oriented trailing edge 78 and an arcuately oriented leading edge 80. It is to be understood that three or more bracket tabs may be formed from the annular cam bracket 68, so long as they are circumferentially spaced in cooperative relation with the cam plate tabs of the annular cam plate 48. The bracket tabs 70, 72, 74 and 76 are circumferentially spaced in cam-engageable relation with the cam plate tabs 50, 52, 54 and 56. When so engaged they cooperate with the cam plate tabs to secure the power head 10 to the panel 44. All of the tabs of the cam plate and the bracket are spring-like in action to maintain tight axial loading when engaged in securing relation. The leading edges 60 of the cam plate tabs 50, 52, 54 and 56 engage the bracket tabs 70, 72, 74 and 76 as the power head is placed in position and rotated about the axis of the power head and push rod. This engagement is in cammed spring-loaded relation so that the power head is mounted firmly to the panel 44. In accordance with the definition of a leading edge set forth above, each edge 60 of each cam plate tab is first approached by each edge 80 of each cam bracket tab as the cam bracket 68 is rotated clockwise as seen in FIG. 3 to the secured position shown in that Figure. The power head may be arcuately rotatable in the opposite direction to disengage the bracket tabs from the cam plate tabs to remove the power head from the panel. In some instances, it is desirable to have the bracket tabs 70, 72, 74 and 76 so arranged that their leading edges 80 are spaced axially from the panel 44 for a distance which is different from that of the trailing edges of those tabs so that the bracket tabs are each positioned in a plane which is at an angle to the plane of the panel 44. Therefore in some instances bracket tabs 70, 72, 74 and 76 are the angled cam tabs and in other instances the cam plate tabs 50, 52, 54 and 56 are the angled tabs. In other instances it may be desirable to provide both sets of tabs at angles so as to increase camming and spring-like securing action.

The annular cam bracket 68 has a detachable and reattachable arm 82 extending outwardly therefrom. Arm 82 is provided with an opening which is preferably a hook-shaped end 84 on its outer end which extends parallel to and in surface engagement with panel 44 when installed. A bolt, nut and washer assembly 94 extends through opening 62 and hooked-shaped end 84 and secures arm 82 on panel 44 against rotation and axial movement.

Figure 2:
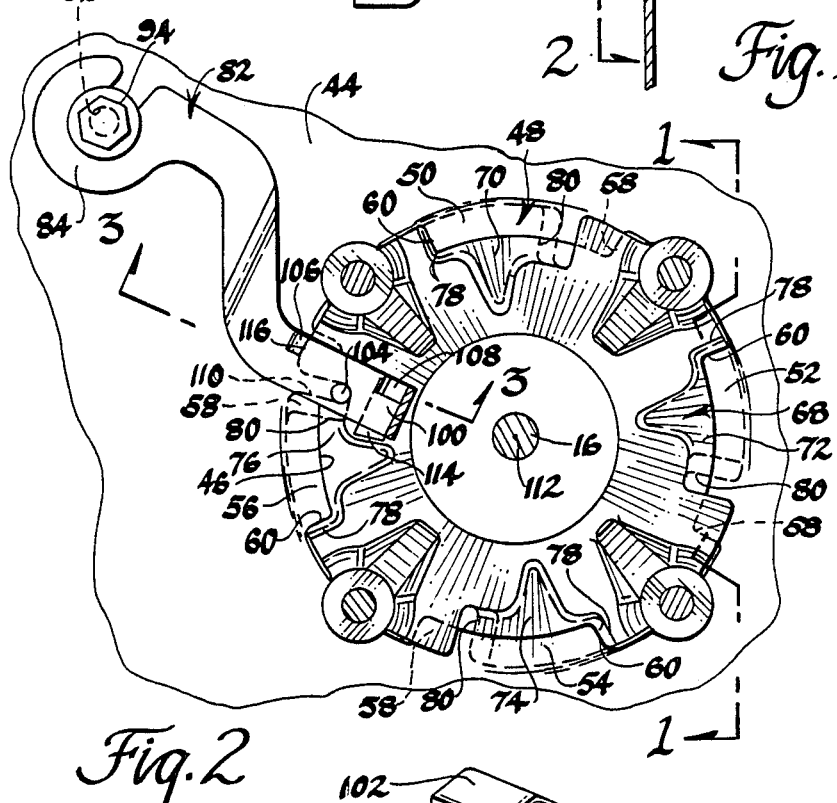
FIG. 2 is a fragmentary cross-section view taken in the direction of arrows 2—2 of FIG. 1 and showing the mounting and securing arrangement embodying the invention in elevation.

In order to mount the booster assembly 10 to the panel 44, it is merely necessary to axially align the push rod 16 with the panel opening 46 and to align the bracket tabs 70, 72, 74 and 76 with spaces between the cam plate tabs 50, 52, 54 and 56. As seen in FIG. 2, this should place the bracket arm 82 at an upwardly and leftwardly extending angle. The entire booster assembly is then arcuately rotated clockwise as seen in FIG. 2 so that the tabs 50, 52, 54 and 56 and the tabs 70, 72, 74 and 76 operate in camming spring loaded relation to tightly secure the power head 10 to the panel 44. In doing so the two sets of tabs are positioned as best shown in FIG. 2. Bracket arm 82 extends toward the opening 62 of panel 44 so that the inner end of the slot formed by hook-shaped end 84 overlies opening 62. The bolt, nut and washer assembly 94 is then tightened to hold the arm 82 in position, preventing any arcuate movement of the cam bracket 68 and booster 18 in either arcuate direction.

In the first noted U.S. patent application, the arm is an integral and permanent part of the housing plate and therefore may create certain problems during shipping and handling before being secured in place because of its extension well beyond the housing plate in the power head. The arm arrangement in the second noted copending U.S. patent application uses a much shorter arm and an intersecting arc locking tab arrangement for securing the arm in place. The arm 82 and its connection to the cam bracket 68 embodies the improvement to which the invention is particularly directed. The arm 82 and its connection to the cam bracket 68 embodies the improvement to which the invention is particularly directed. The arm is entirely separate from the cam bracket 68, but is readily secured thereto shortly before the booster is to be installed in placed in the vehicle. The inner end of arm 82 is reversely bent as shown at 100 so that the extreme end 102 thereof extends in the reverse direction to the main body of arm 82 and is substantially parallel thereto. Since the arm 82 is made of a material having spring characteristics, the reverse bend 100 gives a spring-like action to the arm extreme end 102 which, as will be described below, assists in holding the arm in position. A pivot detent 104 extends from the arm body laterally away from the arm end 102. Pivot detent 104 may be made in any suitable manner, but is illustrated as being struck from a portion of the arm body to the desired configuration. Tabs 106 and 108 are struck from one side of the arm end near the pivot detent 104 but on opposite axially extending sides thereof. Tabs 106 and 108 extend along the length of the arm body but in oppositely bent directions.

Cam plate 48 has a slot 110 extending from the outer periphery thereof along an axis which is slightly skew to the center axis of the booster 10, which is also the axis 112 of the push rod 16, the opening 46, and the annular cam plate 68. Cam plate 68 also has a slot 114 formed therein. The slot may be formed by a struck out bent tab similar to the manner of forming the arm tabs 106 and 108. However, slot 114 extends substantially transversely of a radius of the cam plate, but preferably slightly skew thereto, with the outer end of the tab forming the slot extending clockwise as seen in FIG. 2.

Arm 82 is installed by inserting the reversely bent portion 100 between the cam plate 68 and the booster housing section 66 so that there is a spring like engagement of the reversely bent end 102 with the booster housing section while the main body of arm 82 engages the cam plate 68. At the same time, pivot detent 104 is inserted in the outer end of slot 110 while detent or tab 108 is positioned adjacent the slot 114 but counterclockwise thereof as viewed in FIG. 2. As arm 82 is moved inwardly to move pivot detent 104 toward the inner end of slot 110, the arm is also rotated counterclockwise as seen in FIG. 2 so that detent 108 moves along the tab forming slot 114. As detent 108 reaches the end of the tab forming slot 114 it snaps into place with side engagement thereof against the end of that tab. At this time the end of detent 106 will be engage the with outer radial surface of the cam plate 68 at 116. Detent 108 extending in slot 114 and against the end of the tab forming that slot effectively prevents the arm 82 from being further moved arcuately about pivot detent 104 and also prevents the arm from being moved radially outwardly of the cam plate. Detent 106 provides further arm stability. Once the arm 82 is in place, the booster may be installed as above described.

This arrangement provides a separate arm which is secured to the booster and cam plate assembly immediately before installation of the booster in the vehicle, may be quickly snapped in place, and is retained in place once it is so positioned.

I claim:

1. An arm and bracket mounting assembly for mounting said arm and said bracket to a fixed wall, said assembly comprising:

a bracket having a housing section secured thereto with a part thereof in spaced relation to said bracket;

an arm removably secured to said bracket and having an inner end engaging said bracket and said housing section in spring loaded relation, said arm inner end having a reversely bent spring section, an arm outer end having means adapted to fixedly but removably secure said arm to the fixed wall, and an arm main body having a pivot extending laterally therefrom and detent tab means formed thereon;

said bracket having pivot-receiving slot means and detent tab receiving means respectively receiving said arm pivot and at least one of said arm detent tab means, said pivot-receiving slot means having an open outer end and a closed inner end;

and as said arm is pivoted and moved translationally on said bracket said arm spring section inner end engages said bracket and said housing section in spring loaded relation and said arm detent tab means is removably but lockingly secured to said bracket by said detent tab receiving means and said arm pivot enters said bracket pivot-receiving slot means outer end and moves into said inner end thereof, so that said arm is fixedly but removably secured to said bracket.

2. In an arrangement for rotatably mounting and dismounting a brake booster assembly about the brake booster axis to and from a fixed panel, mechanism selectively securing the brake booster assembly in its mounted position against rotation about its axis relative to the fixed panel, said mechanism comprising:

a bracket secured to the brake booster in part in axially spaced relation thereto and forming a part of said brake booster assembly and providing a part of the brake booster mounting and dismounting arrangement, said bracket having an annular main body provided with rotatable camming means thereon which are adapted to cooperate with mating camming means on the fixed panel to mount the brake booster assembly;

an arm for said bracket which is separate therefrom and normally secured to said bracket and the brake booster in an axially extending space therebetween immediately before the brake booster is mounted on the fixed panel so as to prevent damage to said arm during shipping and handling before installation, said arm having a main body, an outer end and an inner end, an opening in its outer end adapted to receive means securing said arm to the fixed panel after the brake booster assembly is in its mounted position on the fixed panel, a pivot detent extending laterally from said arm main body, a reversely bent spring section formed by said arm inner end with the end of said spring section being laterally spaced from said pivot detent on the opposite side of said arm main body from the extension direction of said pivot detent, a first detent tab extending from said arm main body on one side of said pivot detent and a second detent tab extending from said arm main body on the other side of said pivot detent;

said bracket having an outer edge surface, a first slot formed therein extending inwardly from said outer edge surface to a slot inner end, and a second slot formed by a tab struck out of said bracket extending generally perpendicular to the direction of inward extension of said first slot and spaced from said first slot inner end to receive said arm second detent tab when said arm pivot detent is in said first slot inner end, said second slot extending further than said tab forming same to provide an opening defined in part by one end of said tab;

said arm being secured to said bracket and booster by positioning said arm inner end in the axially extending space between said bracket and a part of said booster housing section and in surface engagement with said bracket with said arm spring section end engaging said booster housing section in spring loaded condition and said pivot detent in said bracket first slot, said arm then being moved inwardly and pivoted relative to said bracket about the axis of said pivot detent as said pivot detent is moved into said bracket first slot inner end, concurrently moving said arm second detent tab into said bracket second slot and beyond the end of said tab forming said bracket second slot and snapping said arm second detent tab into said bracket second slot opening, said arm second detent tab then being held therein by engagement with the end of said tab forming said bracket second slot opening, said arm first detent tab concurrently engaging said bracket outer edge surface adjacent said bracket first slot, so that said arm is lockingly secured to said bracket and booster;

said arm outer end having means for securing same to said fixed wall when installation of said booster assembly is completed.

* * * * *